United States Patent
Nishiyama et al.

(10) Patent No.: US 10,931,869 B2
(45) Date of Patent: Feb. 23, 2021

(54) IMAGING APPARATUS AND CONTROL METHOD THEREFOR

(71) Applicant: FUJIFILM Corporation, Tokyo (JP)

(72) Inventors: Yukinori Nishiyama, Saitama (JP); Yuji Hasegawa, Saitama (JP); Satoru Wakabayashi, Saitama (JP); Tomoyuki Mizuta, Saitama (JP); Shunta Ego, Saitama (JP); Atsushi Misawa, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/425,609

(22) Filed: May 29, 2019

(65) Prior Publication Data

US 2019/0281212 A1 Sep. 12, 2019

Related U.S. Application Data

(63) Continuation of application No. PCT/JP2017/042964, filed on Nov. 30, 2017.

(30) Foreign Application Priority Data

Nov. 30, 2016 (JP) .............................. JP2016-232782

(51) Int. Cl.
*H04N 5/232* (2006.01)
*G03B 17/18* (2021.01)
(Continued)

(52) U.S. Cl.
CPC ......... *H04N 5/23222* (2013.01); *G03B 17/02* (2013.01); *G03B 17/18* (2013.01);
(Continued)

(58) Field of Classification Search
None
See application file for complete search history.

(56) References Cited

U.S. PATENT DOCUMENTS

| 2007/0126877 A1* | 6/2007 | Yang | H04N 5/225 348/207.99 |
| 2009/0002506 A1 | 1/2009 | Koda | |
| 2015/0026632 A1* | 1/2015 | Wakabayashi | H04N 5/23209 715/776 |

FOREIGN PATENT DOCUMENTS

| CN | 1976397 A1 | 6/2007 |
| CN | 101335830 A | 12/2008 |

(Continued)

OTHER PUBLICATIONS

International Preliminary Report on Patentability and Written Opinion of the International Searching Authority(Forms PCT/IB/326, PCT/IB/373 and PCT/ISA/237), dated Jun. 13, 2019, for International Application No. PCT/JP2017/042964, with an English Translation of the Written Opinion.

(Continued)

*Primary Examiner* — Quan Pham
(74) *Attorney, Agent, or Firm* — Birch, Stewart, Kolasch & Birch, LLP

(57) ABSTRACT

A digital camera includes a rear display unit, an imaging optical system, an operation button, a touch panel, a shutter unit, an imaging element, a main control unit, a digital signal processing unit, and a setting information storage unit. After setting information is set in a first setting item and a second setting item of an imaging condition, in a case where the setting information of the first setting item is changed through the touch panel, the main control unit changes the setting information of the second setting item to setting information according to the setting information of the first setting item after the change. When determination is made that a specific setting operation is performed, the main control unit reads the setting information of the first setting item and the second setting item from the setting information storage unit and restores the setting information to the setting information before the change.

8 Claims, 13 Drawing Sheets

(51) Int. Cl.
*G03B 17/02* (2021.01)
*G06F 3/0484* (2013.01)
*G06F 3/0482* (2013.01)

(52) U.S. Cl.
CPC ......... *G06F 3/04847* (2013.01); *H04N 5/232* (2013.01); *H04N 5/232933* (2018.08); *G06F 3/0482* (2013.01)

(56) References Cited

FOREIGN PATENT DOCUMENTS

| | | |
|---|---|---|
| CN | 103309834 A | 9/2013 |
| JP | 2002-290801 A | 10/2002 |
| JP | 2005-221623 A | 8/2005 |
| JP | 2009-44409 A | 2/2009 |
| JP | 2011-130031 A | 6/2011 |
| JP | 2013-31205 A | 2/2013 |
| JP | 2013-219440 A | 10/2013 |
| JP | 2015-153325 A | 8/2015 |
| WO | WO 2016/114015 A1 | 7/2016 |

OTHER PUBLICATIONS

International Search Report, dated Feb. 6, 2018, for International Application No. PCT/JP2017/042964, with an English translation.
Chinese Office Action and Search Report dated Jun. 3, 2020 for corresponding Application No. 201780074045.5, along with an English translation of the Office Action.
Office Action dated Nov. 16, 2020 in corresponding Chinese Patent Application No. 201780074045.5, with English translation.

\* cited by examiner

FIG. 4

| SETTING MENU | |
|---|---|
| IMAGE QUALITY MODE | FINE |
| SHUTTER SYSTEM | ES + MS |
| FLASH MODE | AUTO |
| IMAGING MODE | BRACKET |
| ISO SENSITIVITY | 1600 |
| DYNAMIC RANGE SETTING | 400 |

NEXT PAGE

M → SETTING MENU

FIG. 5

| IMAGE QUALITY MODE | FINE |
|---|---|
| | NORMAL |
| | FINE + RAW |
| | NORMAL + RAW |
| | RAW |

RETURN  OK

FIG. 6

| SHUTTER SYSTEM | MS |
| --- | --- |
| | ES |
| | MS + ES |

RETURN        OK

FIG. 7

| FLASH MODE | AUTO |
| --- | --- |
| | FORCED FLASH |
| | SLOW SYNCHRO |
| | REAR-CURTAIN SYNCHRO |
| | SUPPRESSED FLASH |

RETURN        OK

FIG. 8

| IMAGING MODE | SINGLE FRAME IMAGING |
| | CONTINUOUS IMAGING |
| | BRACKET IMAGING |

RETURN    OK

FIG. 9

| ISO SENSITIVITY | AUTO |
| | 200 |
| | 250 |
| | 320 |
| | 400 |
| | 800 |
| | 1600 |
| | 3200 |
| | 6400 |
| | 12800 |
| | 25600 |

RETURN    OK

FIG. 10

| DYNAMIC RANGE SETTING | AUTO |
| --- | --- |
| | 100 |
| | 200 |
| | 400 |

RETURN  OK

FIG. 11A

| ISO SENSITIVITY | AUTO |
| --- | --- |
| | 200 |
| | 250 |
| | 320 |
| | ⋮ |
| | 1600 |
| | ⋮ |
| | 12800 |
| | 25600 |

| DYNAMIC RANGE SETTING | AUTO |
| --- | --- |
| | 100 |
| | 200 |
| | 400 |

FIG. 11B

| ISO SENSITIVITY | AUTO |
| --- | --- |
| | 200 |
| | 250 |
| | 320 |
| | ⋮ |
| | 1600 |
| | ⋮ |
| | 12800 |
| | 25600 |

| DYNAMIC RANGE SETTING | AUTO |
| --- | --- |
| | 100 |
| | 200 |
| | 400 |

FIG. 12

| SETTING INFORMATION STORAGE UNIT ||
|---|---|
| BEFORE CHANGE | AFTER CHANGE |
| ISO SENSITIVITY 1600 | ISO SENSITIVITY 200 |
| DYNAMIC RANGE SETTING 400 | DYNAMIC RANGE SETTING 100 |

M → SETTING MENU

| IMAGE QUALITY MODE | FINE |
|---|---|
| SHUTTER SYSTEM | ES + MS |
| FLASH MODE | AUTO |
| IMAGING MODE | BRACKET |
| ISO SENSITIVITY | 200 |
| DYNAMIC RANGE SETTING | 100 |

NEXT PAGE

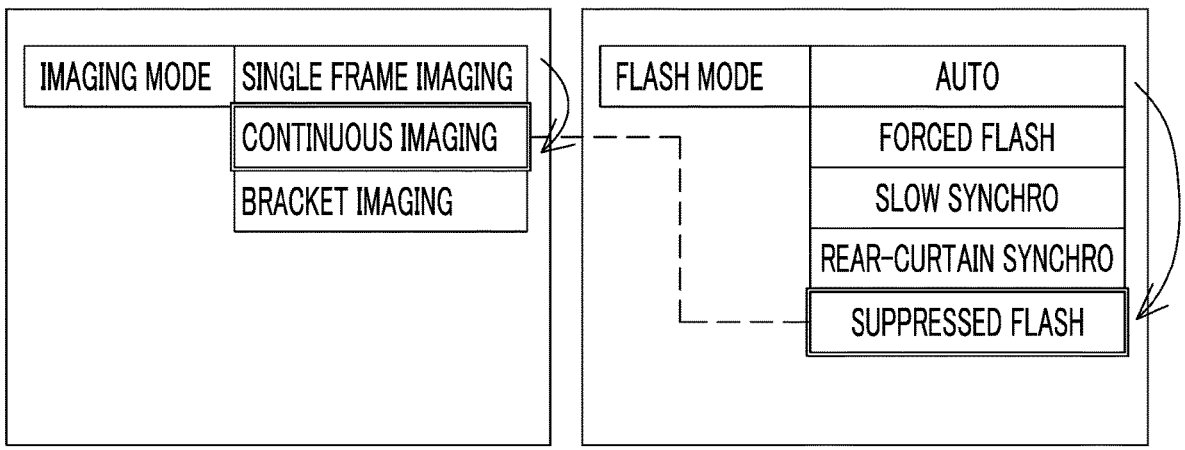

FIG. 18A
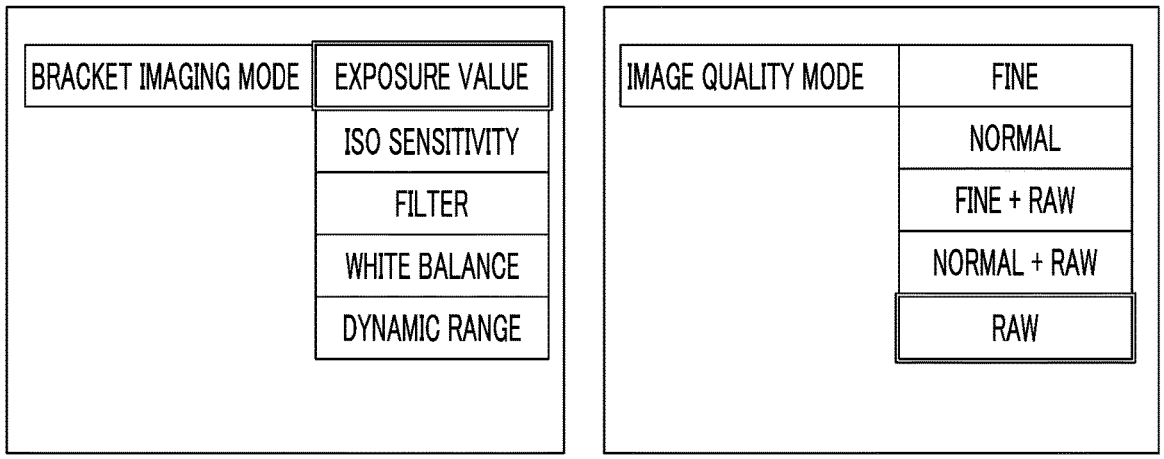
FIG. 18B
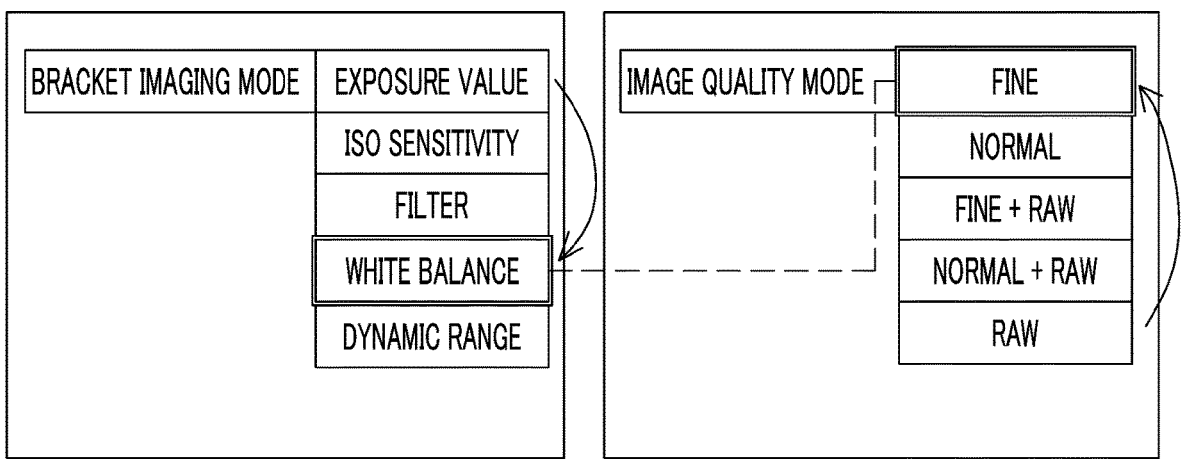
FIG. 19

FIG. 21

SETTING MENU

| IMAGE QUALITY MODE | FINE |
|---|---|
| SHUTTER SYSTEM | ES + MS |
| FLASH MODE | AUTO |
| IMAGING MODE | BRACKET |
| ISO SENSITIVITY | 200 |
| DYNAMIC RANGE SETTING | 100 |

NEXT PAGE

| DYNAMIC RANGE SETTING | AUTO |
|---|---|
| | 100 |
| | 200 |
| | 400 |

RETURN　　　　　OK

IMAGING APPARATUS AND CONTROL METHOD THEREFOR

CROSS-REFERENCE TO RELATED APPLICATIONS

This application is a Continuation of PCT International Application No. PCT/JP2017/042964 filed on 30 Nov. 2017, which claims priority under 35 U.S.C. § 119(a) to Japanese Patent Application No. 2016-232782 filed on 30 Nov. 2016. The above application is hereby expressly incorporated by reference, in its entirety, into the present application.

BACKGROUND OF THE INVENTION

1. Field of the Invention

The present invention relates to an imaging apparatus and a control method therefor.

2. Description of the Related Art

Among imaging apparatuses, such as a digital camera, an imaging apparatus that can set various imaging conditions to capture high-quality images is known. In such an imaging apparatus, in general, there is setting information that cannot be set simultaneously and is in a so-called exclusive relationship in a plurality of imaging conditions.

An imaging apparatus described in JP2013-219440A has a dynamic range magnified imaging function and an exposure adjustment function. In the imaging apparatus, imaging conditions relating to the exposure adjustment function can be set from setting information of a plurality of shutter speeds, a plurality of F-numbers, AUTO (automatic setting), and the like, and setting information of on/off can be set as imaging conditions relating to the dynamic range magnified imaging function. However, these kinds of setting information have an exclusive relationship, and in a case where any one of a shutter speed and an F number is selected, the dynamic range magnified imaging function cannot be turned on. Alternatively, in a case where the dynamic range magnified imaging function is turned on, the exposure adjustment function cannot be set other than AUTO.

As the setting information having the exclusive relationship, in addition to the above-described setting information, setting information of a shutter system and setting information of a continuous shooting speed are exemplified. For example, the shutter system can be set from setting information of an electronic shutter, a mechanical shutter, and the like, and the continuous shooting speed can be set from a plurality of set values. Then, in a case where the mechanical shutter of a lower speed than the electronic shutter is selected, a set value of high speed cannot be selected as the continuous shooting speed.

In recent years, a technique that detects a state in which a user is confused about an operation is known. In an information processing apparatus described in JP2015-153325A, a detection signal obtained by detecting motion or a state of the user is analyzed, and a user operation state when the user performs an operation is detected. Then, the detected user operation state is collated with confused state information stored in advance, and determination is made whether or not the user is confused about an operation.

SUMMARY OF THE INVENTION

As described above, in a case where there is setting information in an exclusive relationship, the setting information is restricted to setting information unintended by the user. For example, in a case where the electronic shutter of the imaging apparatus is a sequential reading type rolling shutter, and high-speed continuous imaging is performed, a rolling shutter phenomenon that a subject image is distorted may occur. Accordingly, in a case where the user changes the shutter system from the electronic shutter to the mechanical shutter, as described above, the continuous shooting speed is restricted to a set value of low speed.

While the user will perform high-speed continuous imaging, since the continuous shooting speed is restricted to a low speed, the user is confused about an operation. Even though the user tries to restore the continuous shooting speed to a high speed, the user cannot specify a cause, and may lose a chance to capture an image.

In the imaging apparatus described in JP2013-219440A described above, a warning is performed in a case where the setting information in the exclusive relationship is set regardless of an operation state of the user. It is considered that the technique described in JP2015-153325A described above is applied to the imaging apparatus described in JP2013-219440A described above, and in a case where the confused state of the user is detected, a warning that the setting information in the exclusive relationship is set is performed. However, even in this case, the user who is unaccustomed to setting cannot easily determine how the setting information should be changed, and may lose a chance to capture an image.

An object of the invention is to provide an imaging apparatus that determines a state in which a user is confused about an operation and easily resolves a confused state, and a control method therefor.

In order to achieve the above-described object, an imaging apparatus of the invention comprises an imaging unit, a setting operation unit, a setting information storage unit, a setting change unit, a determination unit, and a setting restoration unit. The imaging unit captures a subject image. The setting operation unit sets setting information of a first setting item and setting information of a second setting item selectable exclusively with respect to the setting information of the first setting item as setting items relating to imaging conditions of the imaging unit. The setting information storage unit stores the setting information of the first setting item and the setting information of the second setting item. In a case where the setting information of the first setting item is changed through an operation of the setting operation unit after the setting information is set in the first setting item and the second setting item, the setting change unit changes the setting information of the second setting item to setting information according to the setting information of the first setting item after the change. The determination unit determines whether or not a specific setting operation is performed by the setting operation unit on the second setting item changed by the setting change unit. The setting restoration unit restores the setting information of the first setting item and the second setting item to the setting information before the change stored in the setting information storage unit in a case where the determination unit determines that the specific setting operation is performed.

It is preferable that the imaging apparatus further comprises a display unit on which a setting screen including the second setting item is displayed, and the determination unit determines whether or not the specific setting operation is performed in a case where the setting screen is displayed on the display unit.

It is preferable that the display unit displays the setting information of the second setting item after the change, and the determination unit determines that the specific setting operation is performed in a case where a setting operation on the second setting item is continued by the setting operation unit for a predetermined time or more.

It is preferable that the display unit displays the setting information of the second setting item after the change in a special display form, and the determination unit determines that the specific setting operation is performed in a case where a setting operation is performed on the setting information of the second setting item displayed in the special display form.

It is preferable that the imaging apparatus further comprises a special operation unit that is used in an operation different from a normal setting operation of the setting operation unit, and the determination unit determines that the specific setting operation is performed in a case where the setting screen is displayed on the display unit and an operation of the special operation unit is performed.

It is preferable that the setting screen is a setting list screen on which a plurality of setting items are displayed. It is preferable that the setting screen is a setting confirmation screen including the setting information of the second setting item.

It is preferable that the setting screen is a setting list screen on which a plurality of setting items are displayed and a setting confirmation screen including the setting information of the second setting item, and the determination unit counts the number of repetitions in which display of the setting list screen and display of the setting confirmation screen are alternately repeated, and determines that the specific setting operation is performed in a case where the number of repetitions is equal to or greater than a predetermined number of repetitions.

A control method for an imaging apparatus of the invention comprises a step of setting setting information of a first setting item and setting information of a second setting item selectable exclusively with respect to the setting information of the first setting item as setting items relating to imaging conditions of an imaging unit, a step of storing the setting information of the first setting item and the setting information of the second setting item, a step of, in a case where the setting information of the first setting item is changed after the setting information is set in the first setting item and the second setting item, changing the setting information of the second setting item to setting information according to the setting information of the first setting item after the change, a step of determining whether or not a specific setting operation is performed on the changed second setting item, and a step of restoring the setting information of the first setting item and the second setting item to the stored setting information before the change in a case where determination is made that the specific setting operation is performed.

According to the invention, it is possible to determine a state in which a user is confused about an operation, and to easily resolve a confused state.

BRIEF DESCRIPTION OF THE DRAWINGS

FIG. 4 is an explanatory view of a setting screen showing an example of a setting menu.

FIG. 5 is an explanatory view of a setting screen showing a selection candidate list in a case where a setting item of an image quality mode is selected in the setting menu.

FIG. 6 is an explanatory view of a setting screen showing a selection candidate list in a case where a setting item of a shutter system is selected in the setting menu.

FIG. 7 is an explanatory view of a setting screen showing a selection candidate list in a case where a setting item of a flash mode is selected in the setting menu.

FIG. 8 is an explanatory view of a setting screen showing a selection candidate list in a case where a setting item of an imaging mode is selected in the setting menu.

FIG. 9 is an explanatory view of a setting screen showing a selection candidate list in a case where a setting item of ISO sensitivity is selected in the setting menu.

FIG. 10 is an explanatory view of a setting screen showing a selection candidate list in a case where a setting item of dynamic range setting is selected in the setting menu.

FIG. 11A is an explanatory view showing an example of a setting screen before setting information of ISO sensitivity is changed.

FIG. 11B is an explanatory view showing an example of a setting screen in a case where the setting information of the ISO sensitivity is changed and setting information of the dynamic range setting is changed to setting information according to the setting information of the ISO sensitivity.

FIG. 12 is an explanatory view illustrating storing the setting information of the ISO sensitivity and the setting information of the dynamic range setting before the change and after the change in the setting information storage unit.

FIG. 13 is an explanatory view illustrating a specific setting operation.

FIG. 16A is an explanatory view showing an example of a setting screen before setting information of the imaging mode is changed in a second embodiment.

FIG. 16B is an explanatory view showing an example of a setting screen in a case where the setting information of the imaging mode is changed and setting information of the flash mode is changed to setting information according to the setting information of the imaging mode.

FIG. 17 is an explanatory view of a setting screen showing a selection candidate list in a case where a setting item of a bracket imaging mode is selected in a third embodiment.

FIG. 18A is an explanatory view showing an example of a setting screen before setting information of the bracket imaging mode is changed in the third embodiment.

FIG. 18B is an explanatory view showing an example of a setting screen in a case where the setting information of the bracket imaging mode is changed and setting information of the image quality mode is changed to setting information according to the setting information of the bracket imaging mode.

FIG. 19 is an explanatory view of a setting screen showing a selection candidate list in a case where a setting item of a continuous shooting speed is selected in a fourth embodiment.

FIG. 21 is an explanatory view showing an example of a specific setting operation with which the setting screen of the setting menu and the setting screen of the selection candidate list are alternately repeated.

DESCRIPTION OF THE PREFERRED EMBODIMENTS

First Embodiment

Figure 1:
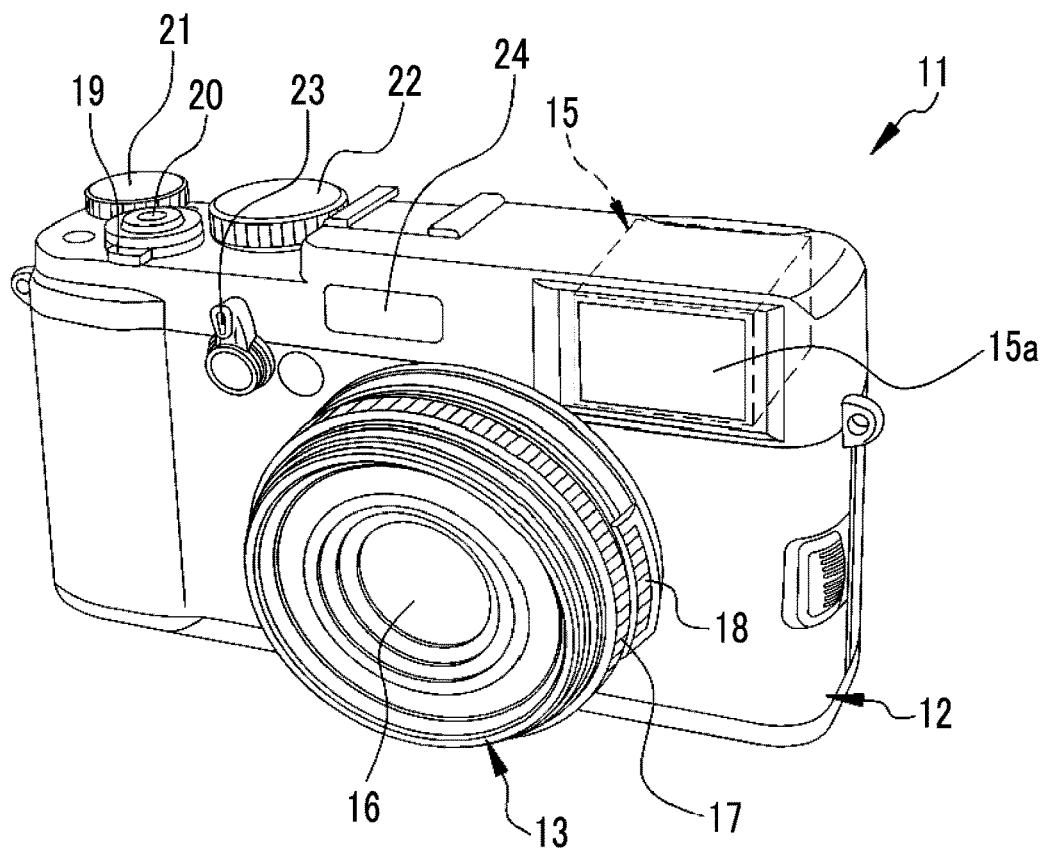
FIG. 1 is a perspective view showing an appearance of a digital camera from a front side.
Figure 2:
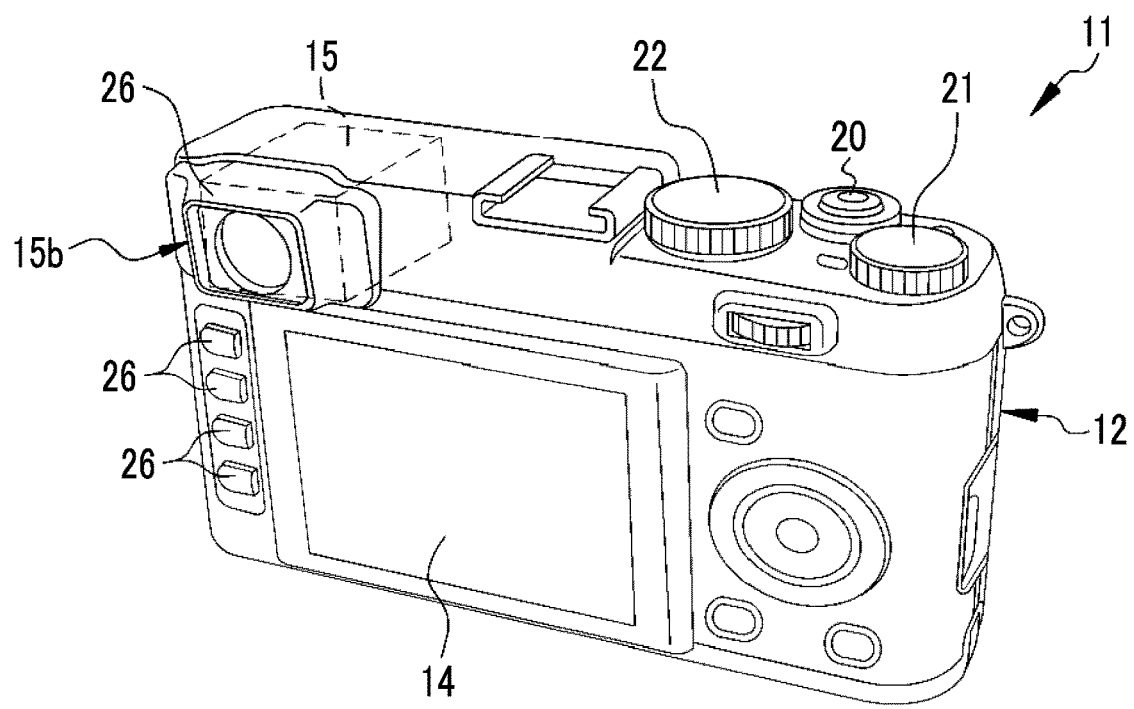
FIG. 2 is a perspective view showing the appearance of the digital camera from a rear side.

In FIGS. 1 and 2, a digital camera 11 comprises a camera body 12, a lens barrel 13, a rear display unit 14, and a finder unit 15.

The lens barrel 13 is provided on a front surface of the camera body 12, and holds an imaging optical system 16. A focus ring 17 and a stop ring 18 are provided rotatably on an outer periphery of the lens barrel 13. The focus ring 17 and the stop ring 18 are manually rotated by a photographer, thereby performing focus adjustment and stop adjustment of the imaging optical system 16.

The rear display unit 14 is provided on a rear surface of the camera body 12 and is used for display of a live view image, reproduction of a captured image, display of a setting menu, and the like. The rear display unit 14 is constituted of, for example, an LCD panel. A touch panel 27 (see FIG. 3) is attached to a surface of the rear display unit 14, and an input instruction from the touch panel 27 is transmitted to a main control unit 41.

A power lever 19, a release switch 20, an exposure correction dial 21, a shutter speed dial 22, and the like are provided on an upper surface of the camera body 12. A finder switch lever 23, a flash light emission unit 24, and the like are provided on the front surface of the camera body 12. A plurality of operation buttons 26 are provided on the rear surface of the camera body 12. A plurality of operation buttons 26 are used for various setting operations and the like.

The power lever 19 is operated in turning on/off a power source (not shown) of the digital camera 11. The release switch 20 is operated in executing imaging. The shutter speed dial 22 is operated in switching a shutter speed of the digital camera 11.

The release switch 20 has a two-stage stroke type switch (not shown) constituted of an S1 switch and an S2 switch. The digital camera 11 performs an imaging preparation operation, such as automatic exposure adjustment, when the release switch 20 is depressed (half depression) and the S1 switch is brought into an on state. When the release switch 20 is further depressed (full depression) from this state and the S2 switch is brought into an on state, an imaging operation is performed.

In a bottom portion of the camera body 12, a slot (not shown) for mounting a recording medium 51 (see FIG. 3) described below and a loading lid (not shown) for opening and closing an aperture of the slot are provided.

The finder unit 15 is a hybrid type capable of switching between an optical view finder (hereinafter, referred to as an "OVF") mode and an electronic view finder (hereinafter, referred to as an "EVF") mode. The finder switch lever 23 is operated in switching the finder unit 15 between the OVF mode and the EVF mode.

The finder unit 15 has a finder objective window 15a that takes an optical image of a subject, and a finder eyepiece unit 15b with which an eye of the photographer comes into contact. The finder objective window 15a is provided on the front side of the camera body 12. The finder eyepiece unit 15b is provided on the rear side of the camera body 12.

The finder unit 15 comprises an in-finder display unit 28 (see FIG. 3), a half mirror (not shown), and the like. The in-finder display unit 28 displays an image of the subject obtained by capturing the optical image of the subject with the imaging element 34. The optical image of the subject is incident on the finder objective window 15a. The half mirror partially transmits the optical image incident on the finder objective window 15a to guide the optical image to the finder eyepiece unit 15b, and partially reflects the display image displayed on the in-finder display unit 28 to guide the display image to the finder eyepiece unit 15b.

The finder unit 15 has a shutter (hereinafter, referred to as an OVF shutter) that shields the optical image incident on the finder objective window 15a. In the OVF mode, the OVF shutter is brought into an open state and the in-finder display unit 28 is brought into a non-display state, whereby the optical image is guided to the finder eyepiece unit 15b. In EVF mode, the OVF shutter is brought into a closed state and the in-finder display unit 28 is brought into a display state, whereby the display image is guided to the finder eyepiece unit 15b.

Figure 3:
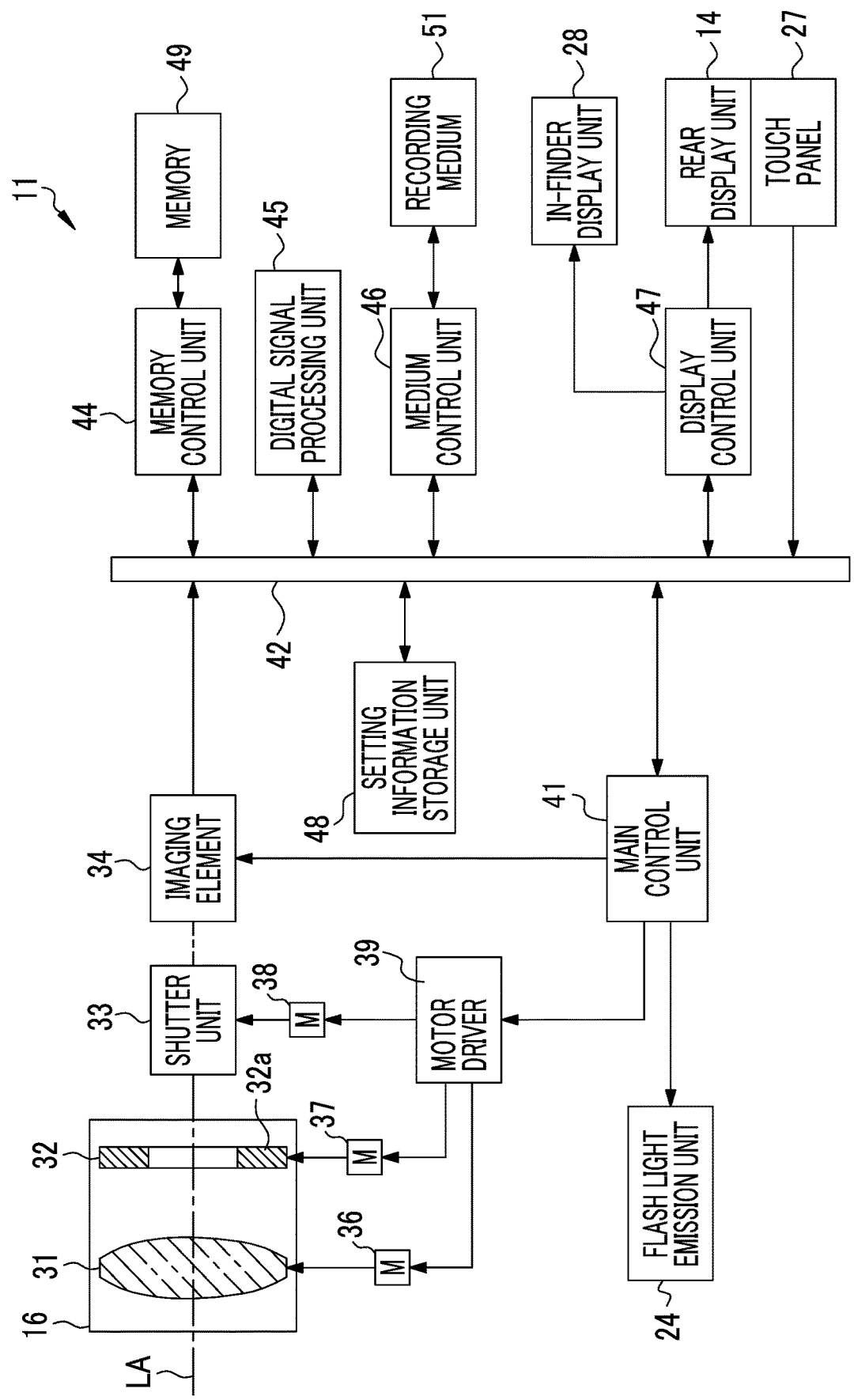
FIG. 3 is a block diagram showing the configuration of the digital camera.

In FIG. 3, the imaging optical system 16 comprises a plurality of lenses including a focus lens 31, a stop unit 32, and the like. A shutter unit 33 and an imaging element 34 are disposed behind the imaging optical system 16 along an optical axis LA of the imaging optical system 16. The imaging element 34 is provided inside the camera body 12.

The focus lens 31 is moved in a direction of the optical axis LA with driving of a motor 36 and adjusts an imaging distance. The main control unit 41 transmits a control signal for moving the focus lens 31 to a motor driver 39 according to a rotation direction and an amount of rotation of the focus ring 17 detected based on a signal of a detection unit (not shown). The motor driver 39 drives the motor 36 based on the control signal.

The stop unit 32 moves a plurality of stop leaf blades 32a with driving of a motor 37 and changes an amount of light incident on the imaging element 34. The optical image of the subject that is transmitted through the imaging optical system 16 and has an amount of light adjusted by a stop 30 is incident on the imaging element 34. The main control unit 41 transmits a control signal for moving the stop leaf blades 32a to the motor driver 39 according to an angle position of the stop ring 18 detected based on a signal of a detection unit (not shown). The motor driver 39 drives the motor 37 based on the control signal.

The shutter unit 33 is a mechanical shutter, such as a focal plane shutter, and is disposed between the stop unit 32 and the imaging element 34. The shutter unit 33 is provided to shut off an optical path between the imaging optical system 16 and the imaging element 34, and changes between an aperture open state and an aperture closed state.

The shutter unit 33 is brought into the aperture open state at the time of live view image and video imaging. The shutter unit 33 is temporarily brought into the aperture closed state from the aperture open state at the time of static image capturing. The shutter unit 33 is driven by a motor 38. The main control unit 41 transmits a control signal for operating the shutter unit 33 to the motor driver 39 according to setting information of a shutter system described below. The motor driver 39 drives the motor 38 based on the control signal.

The imaging element 34 is driven and controlled by the main control unit 41. The imaging element 34 constitutes an imaging unit along with the shutter unit 33, the digital signal processing unit 45, and the like. In a case of flash imaging using the flash light emission unit 24, the flash light emission unit 24 also constitutes the imaging unit. The imaging element 34 is, for example, a single-plate color imaging type CMOS image sensor having an RGB color filter. The imaging element 34 has a light receiving surface constituted of a plurality of pixels (not shown) arranged in a two-dimensional matrix. Each pixel includes a photoelectric conversion element, and captures the subject image formed on the light receiving surface by the imaging optical system 16 through photoelectric conversion to generate an imaging signal. The imaging element 34 has an electronic shutter function, and a shutter speed (electric charge accumulation time) thereof can be adjusted.

The imaging element 34 comprises signal processing circuits (all are not shown), such as a noise elimination circuit, an automatic gain controller, and an A/D conversion circuit. The noise elimination circuit executes noise elimination processing on the imaging signal. The automatic gain controller amplifies the level of the imaging signal to an optimum value. The A/D conversion circuit converts the imaging signal to a digital signal and outputs the digital signal from the imaging element 34. An output signal of the imaging element 34 is image data (so-called RAW data) having one pixel value for each pixel.

The imaging element 34 and the main control unit 41 are connected to a bus 42. In addition, a memory control unit 44, a digital signal processing unit 45, a medium control unit 46, a display control unit 47, a setting information storage unit 48, and the touch panel 27 are connected to the bus 42.

A memory 49 for temporary storage, such as a synchronous dynamic random access memory (SDRAM), is connected to the memory control unit 44. The memory control unit 44 inputs and stores image data output from the imaging element 34 to the memory 49. The memory control unit 44 outputs image data stored in the memory 49 to the digital signal processing unit 45.

The digital signal processing unit 45 executes known image processing, such as matrix calculation, demosaic processing, γ correction, brightness and color difference conversion, and resizing processing, on image data input from the memory 49, and generates a subject image based on the pixel value of each pixel.

The medium control unit 46 controls recording and reading of image files on and from a recording medium 51. The recording medium 51 is, for example, a memory card embedded with a flash memory. The medium control unit 46 records image data compressed by the digital signal processing unit 45 on the recording medium 51.

The display control unit 47 controls image display on the rear display unit 14 and the in-finder display unit 28. Specifically, the display control unit 47 generates a video signal according to National Television System Committee (NTSC) standard or the like based on image data generated by the digital signal processing unit 45 and outputs the video signal to the rear display unit 14 and the in-finder display unit 28.

In a case where a setting mode is selected by an operation of the operation button 26, the main control unit 41 drives and controls the display control unit 47 to make the rear display unit 14 display a setting menu. The setting menu enables setting of setting items relating to imaging conditions of the imaging unit of the digital camera 11. In the setting menu, a plurality of setting items are displayed.

In a case where the setting mode is selected, the operation button 26 and the touch panel 27 function as a setting operation unit that sets setting information relating to the imaging conditions of the imaging unit. In a case where the setting information is set or changed by the operation button 26 or the touch panel 27, the main control unit 41 makes the setting information storage unit 48 store the setting information. The setting information storage unit 48 is constituted of a nonvolatile memory.

FIG. 4 is an example of a setting menu that is displayed on the rear display unit 14. In a setting menu M, a plurality of setting items, such as an image quality mode, a shutter system, a flash mode, an imaging mode, ISO sensitivity, and dynamic range setting, are displayed. The setting menu M is constituted of, for example, a plurality of pages, and a plurality of setting items are displayed on each page. In this case, it is possible to switch the pages of the setting menu M by the operation button 26 or the touch panel 27. A setting screen on which the setting menu M is displayed corresponds to a setting list screen in the appended claims. A setting screen on which a selection candidate list of each setting item is displayed shown in FIGS. 4 to 10, 11A, 11B, 16A, 16B, 17, 18A, 18B, 19, 21A, and 21B described below corresponds to a setting confirmation screen in the appended claims.

In a case where a user sets setting items relating to the imaging conditions based on the setting menu M, for example, the user operates the operation button 26 to select one setting item from a plurality of setting items.

In a case where a setting item of the image quality mode is selected, as shown in FIG. 5, a selection candidate list of the image quality mode including selection candidates, such as "FINE", "NORMAL", "FINE+RAW", "NORMAL+RAW", and "RAW", is displayed. When the operation button 26 or the touch panel 27 is operated, setting information of the image quality mode is selected from the selection candidate list. In the selection candidate list, "FINE" is a high image quality mode in which an image having a compression ratio of data lower than "NORMAL" is acquired. "RAW" is a mode in which image quality is higher than FINE since an image is recorded without compressing data. "FINE+RAW" is a mode in which images of both of FINE and RAW are acquired, and "NORMAL+RAW" is a mode in which images of both of NORMAL and RAW are recorded.

In a case where a setting item of the shutter system is selected, as shown in FIG. 6, a selection candidate list of the shutter system including selection candidates, such as "MS", "ES", and "MS+ES", is displayed. When the operation button 26 or the touch panel 27 is operated, setting information of the shutter system is selected from the selection candidate list. When "MS" is selected from the selection candidate list, imaging can be performed with a mechanical shutter of the shutter unit 33, when "ES" is selected from the selection candidate list, imaging can be performed with an electronic shutter. When "MS+ES" is selected, imaging can be performed in a state in which one of the mechanical shutter and the electronic shutter suitable for, for example, a shutter speed is automatically selected.

In a case where a setting item of the flash mode is selected, as shown in FIG. 7, a selection candidate list of the flash mode, such as "AUTO", "forced flash", "slow synchro", "rear-curtain synchro", and "suppressed flash", is displayed. When the operation button 26 or the touch panel 27 is operated, setting information of the flash mode is selected from the selection candidate list.

When "AUTO" is selected from the selection candidate list, the flash light emission unit 24 automatically emits flash light in a case where a photometric sensor determines that the subject is dark. When "forced flash" is selected, the flash light emission unit 24 forcibly emits flash light regardless of ambient lightness. When "slow synchro" is selected, the shutter speed is reduced, and the flash light emission unit 24 is made to emit flash light in synchronization with the shutter. When "rear-curtain synchro" is selected, the flash light emission unit 24 is made to emit flash light immediately before the shutter is closed. When "suppressed flash" is selected, the flash light emission unit 24 is not made to emit flash light regardless of ambient lightness.

In a case where a setting item of the imaging mode is selected, as shown in FIG. 8, a selection candidate list of the imaging mode, such as "single frame imaging", "continuous imaging", and "bracket imaging", is displayed. When the operation button 26 or the touch panel 27 is operated, setting information of the imaging mode is selected from the selection candidate list.

When "single frame imaging" is selected from the selection candidate list, each time the release switch 20 is fully depressed once, imaging and recording for one frame are performed. When "continuous imaging" is selected, while the release switch 20 continues to be fully depressed, imaging is performed continuously for the number of frames according to a continuous shooting speed, and captured images for a plurality of frames are recorded. When "bracket imaging" is selected, each time the release switch 20 is fully depressed once, imaging for a plurality of frames is performed while changing a set value, such as an exposure value, and captured images for a plurality of frames are recorded.

In a case where a setting item of the ISO sensitivity is selected, as shown in FIG. 9, a selection candidate list of the ISO sensitivity, such as "AUTO", "200", "250", "320", "400", "800", "1600", "3200", "6400", "12800", and "25600", is displayed. When the operation button 26 or the touch panel 27 is operated, setting information of the ISO sensitivity is selected from the selection candidate list.

When "AUTO" is selected from the selection candidate list, the sensitivity of the imaging element 34 is automatically adjusted within a range of equal to or less than predetermined ISO sensitivity. When a numerical value of "200" to "25600" excluding "AUTO" is selected, the sensitivity of the imaging element 34 is adjusted to the selected numerical value.

In a case where a setting item of the dynamic range setting is selected, as shown in FIG. 10, a selection candidate list of the dynamic range setting, such as "AUTO", "100", "200", and "400", is displayed. When the operation button 26 or the touch panel 27 is operated, setting information of the dynamic range setting is selected from the selection candidate list.

When "AUTO" is selected from the selection candidate list, any one of imaging for acquiring an image of a standard dynamic range according to the size of the imaging element 34 and imaging for acquiring an image of a dynamic range more magnified than the standard dynamic range is automatically selected according to the lightness of the subject, or the like, and imaging is performed. As a method of acquiring an image of a magnified dynamic range, for example, as described in JP2013-031205A or the like, dynamic range magnified image data having excellent reproducibility within a wide range from high brightness to low brightness is acquired by performing imaging under different exposure conditions, acquiring a plurality of pieces of image data different in an amount of information per brightness including an image with a large amount of information on a high brightness side, an image with a large amount of information on a low brightness side, and the like, and composing a plurality of pieces of image data.

When "100" is selected from the selection candidate list, imaging for acquiring an image of the standard dynamic range of the imaging element 34, that is, a dynamic range of 100%, is performed. When "200" is selected, imaging for acquiring an image of a dynamic range magnified to 200% of the standard dynamic range of the imaging element 34 is performed. When "400" is selected, imaging for acquiring an image of a dynamic range magnified to 400% of the standard dynamic range of the imaging element 34 is performed.

Among a plurality of setting items relating to the imaging conditions of the imaging unit, there may be setting information of a second setting item selectable exclusively with respect to setting information of a first setting item. The term "selectable exclusively" means that, in a case where one setting information in the first setting item is selected, setting information selectable in the second setting item is restricted.

The setting information in such an exclusive relationship corresponds to setting information of the ISO sensitivity and setting information of the dynamic range setting. The ISO sensitivity and the dynamic range setting correspond to a first setting item and a second setting item in the appended claims, respectively.

Specifically, in a case where any one of "200", "250", and "320" is selected as the setting information of the ISO sensitivity, in the dynamic range setting, only "100" is selectable as the setting information, and all of "AUTO", "200", and "400" are unselectable. This is because the ISO sensitivity is set to low sensitivity of "200", "250", and "320", and thus, an image with an amount of information within a wide range from high brightness to low brightness cannot be obtained in the imaging unit, that is, an image of a magnified dynamic range cannot be acquired.

FIG. 11A shows after setting information is set in the ISO sensitivity and the dynamic range setting, that is, a state in which setting is completed, the ISO sensitivity is set to "1600", and the dynamic range setting is set to "400" (display surrounded by a double frame line).

In a case where the main control unit 41 changes the setting information of the ISO sensitivity to, for example, "200" according to an operation of the operation button 26 or the touch panel 27 from the state shown in FIG. 11A in which the setting information of the ISO sensitivity and the setting information of the dynamic range setting are set, as described above, there is the setting information of the dynamic range setting selectable exclusively with respect to the ISO sensitivity "200", and all of the "AUTO", "200", and "400" are unselectable. Thus, in this case, as in an example shown in FIG. 11B, the main control unit 41 functions as a setting change unit that changes the setting information of the dynamic range setting to the setting information according to the ISO sensitivity "200", that is, changes the setting information of the dynamic range setting to "100". In the setting screen shown in FIG. 11B, the selection of the setting information of the dynamic range setting is disabled.

In a case where the main control unit 41 functioning as the setting change unit changes the setting information of the dynamic range setting to the setting information according to the setting information of the ISO sensitivity, as in an example shown in FIG. 12, the main control unit 41 makes the setting information storage unit 48 store the setting information of the ISO sensitivity and the setting information of the dynamic range setting before the change and after the change.

In a case where the setting information of the dynamic range setting is changed to the setting information according to the setting information of the ISO sensitivity, as shown in FIG. 13, the main control unit 41 makes the setting item of the setting information of the dynamic range setting in the setting menu M be displayed in a special display form (a meshed portion). In an example shown in FIG. 13, for convenience of drawing, although the setting item and the setting information of the dynamic range setting displayed in the special display form are meshed, the invention is not limited thereto, and the setting item and the setting information of the dynamic range setting may be displayed in a color different from other setting items and setting information, for example, in gray.

In a case where the setting information of the ISO sensitivity is changed to, for example, "25600" from the state in which the setting information of the ISO sensitivity and the setting information of the dynamic range setting are set, there is no setting information of the dynamic range setting selectable exclusively with respect to "25600", and all of "AUTO", "100", "200", and "400" are selectable. Thus, the main control unit 41 does not change the setting information of the dynamic range setting. In this case, the main control unit 41 makes the setting information storage unit 48 store only the setting information of the ISO sensitivity after the change.

As described above, in a case where there is the setting information of the second setting item selectable exclusively with respect to the setting information of the first setting item, since the main control unit 41 changes the setting information of the second setting item to the setting information according to the setting information of the first setting item, in the second setting item, the setting information may be changed to the setting information not desired by the user.

In a case where the setting information is changed to the setting information not desired by the user by the main control unit 41 functioning as the setting change unit, the user is highly likely to be brought into a confused state regardless of why the setting information is changed to such setting information. The confused state refers to a state in which the user does not know how an operation should be performed, half-forgets an operation, or performs an incorrect operation, that is, the user does not perform an operation well and is embarrassed.

Accordingly, the main control unit 41 functions as a determination unit that monitors an operation of the operation button 26 or the touch panel 27, and determines whether or not a specific setting operation is performed by the operation button 26 or the touch panel 27 on the second setting item changed by the main control unit 41. The specific setting operation is a setting operation that is highly likely to be performed when the user is in the confused state.

In the embodiment, in a case where a long depression operation is performed, the main control unit 41 determines that the specific setting operation is performed. The long depression operation refers to a state in which the setting information of the second setting item after the change is displayed on the rear display unit 14, and a setting operation on the second setting item is continued by the operation button 26 or the touch panel 27 for a predetermined time or more.

As in the example shown in FIG. 13, in a case where the setting information of the dynamic range setting is changed to the setting information according to the setting information of the ISO sensitivity, and the setting screen of the setting menu M is displayed on the rear display unit 14, the main control unit 41 determines whether or not a long depression operation is performed. Then, as described above, in a case where a touch operation is performed continuously on the setting item and the setting information of the dynamic range setting displayed in the special display form by the touch panel 27 for a predetermined time or more, determination is made that the specific setting operation is performed. In a case of a touch operation for less than a predetermined time instead of a long depression operation, as described above, the setting screen may be switched to a setting confirmation screen on which the selection candidate list of the dynamic range setting is displayed.

The main control unit 41 functions as a setting restoration unit that, in a case where the main control unit 41 determines that the specific setting operation is performed, restores the setting information of the first setting item and the second setting item to the setting information before the change. In the example shown in FIG. 12, the setting information that the ISO sensitivity is "1600" and the dynamic range setting is "400" is stored in the setting information storage unit 48 as the setting information before the change, and the main control unit 41 reads the setting information and restores the setting information relating to the imaging conditions of the imaging unit to the setting information before the change. The main control unit 41 restores the setting information to the setting information before the change, and restores the setting menu M displayed on the rear display unit 14 to the setting menu M before the change (the state shown in FIG. 4).

Figure 14:
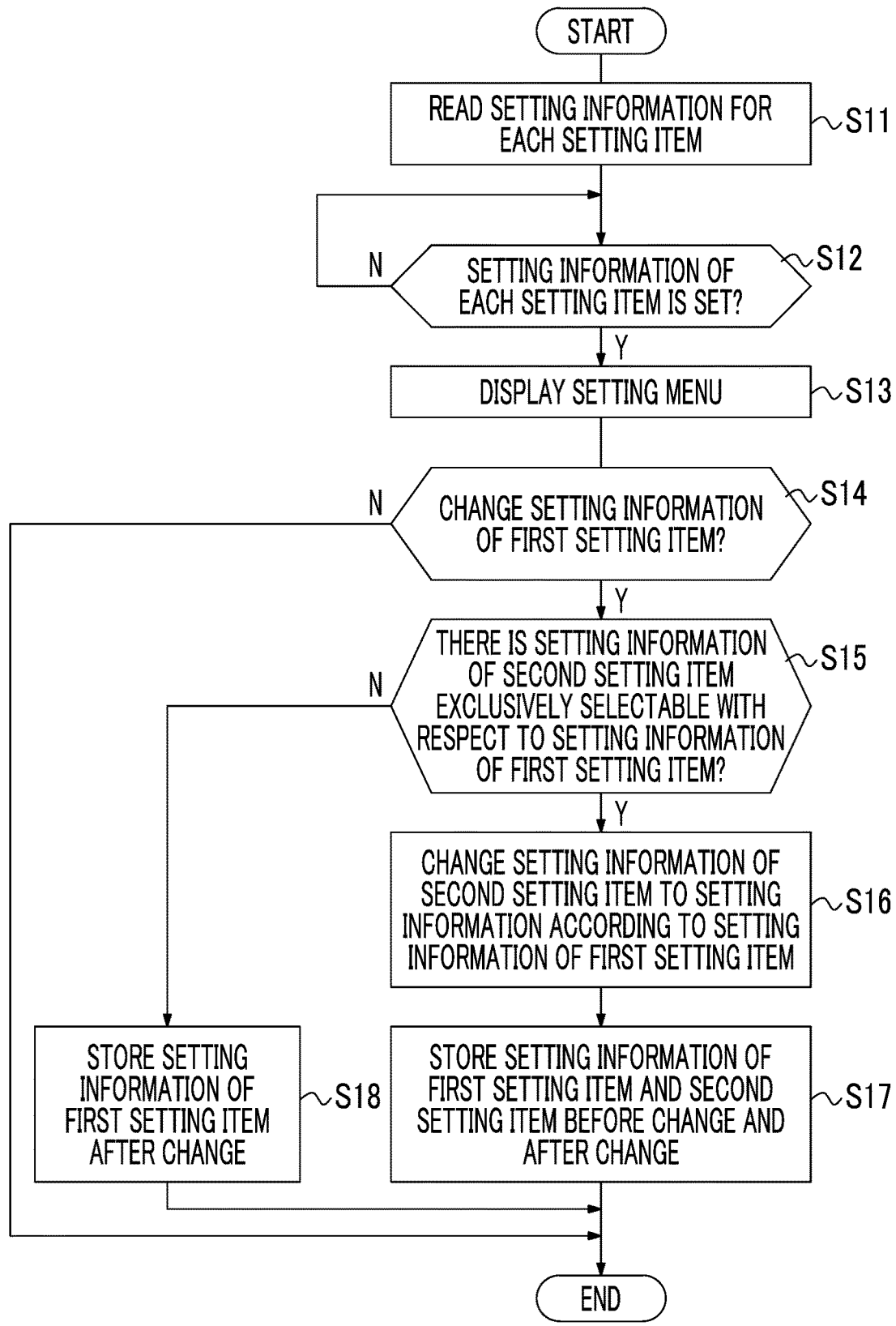
FIG. 14 is a flowchart illustrating processing in changing setting information of imaging conditions.

A processing procedure for changing the setting information relating to the imaging conditions in the digital camera 11 will be described along a flowchart shown in FIG. 14.

In the setting mode of the digital camera 11, the main control unit 41 reads the setting information of the respective setting items from the setting information storage unit 48 (S11). The main control unit 41 determines whether or not the setting information of the respective setting items including the first setting item and the second setting item is set from the read setting information of the respective setting items (S12). In a case where the setting information of the respective setting items is not set (in S12, N), for example, a warning for prompting a setting operation is performed. With this, the setting information is made to be set in the first setting item and the second setting item. Alternatively, the setting information may be initially set in all setting items at the time of factory shipment of the digital camera 11.

In a case where the setting information of the respective setting items is set (in S12, Y), the main control unit 41 makes the rear display unit 14 display the setting screen of the setting menu M (S13). Next, in changing the setting information, determination is made whether or not to change the setting information of the ISO sensitivity (first setting item) based on the setting menu M (S14).

Then, in a case where the setting information of the ISO sensitivity is changed by an operation of the operation button 26 or the touch panel 27 (in S14, Y), the main control unit 41 determines whether or not there is the setting information of the dynamic range setting (second setting item) selectable exclusively with respect to the setting information of the ISO sensitivity (S15).

As in the example shown in FIG. 11B, in a case where there is the setting information of the dynamic range setting selectable exclusively with respect to the setting information of the ISO sensitivity (in S15, Y), the main control unit 41 changes the setting information of the dynamic range setting to the setting information according to the setting information of the ISO sensitivity (S16). In addition, as in the example shown in FIG. 12, the main control unit 41 makes the setting information storage unit 48 store the setting information of the ISO sensitivity and the setting information of the dynamic range setting before the change and after the change (S17).

In a case where there is no setting information of the dynamic range setting selectable exclusively with respect to the setting information of the ISO sensitivity (in S15, N), the main control unit 41 does not change the setting information of the dynamic range setting, and makes the setting information storage unit 48 store only the setting information of the ISO sensitivity after the change (S18).

Figure 15:
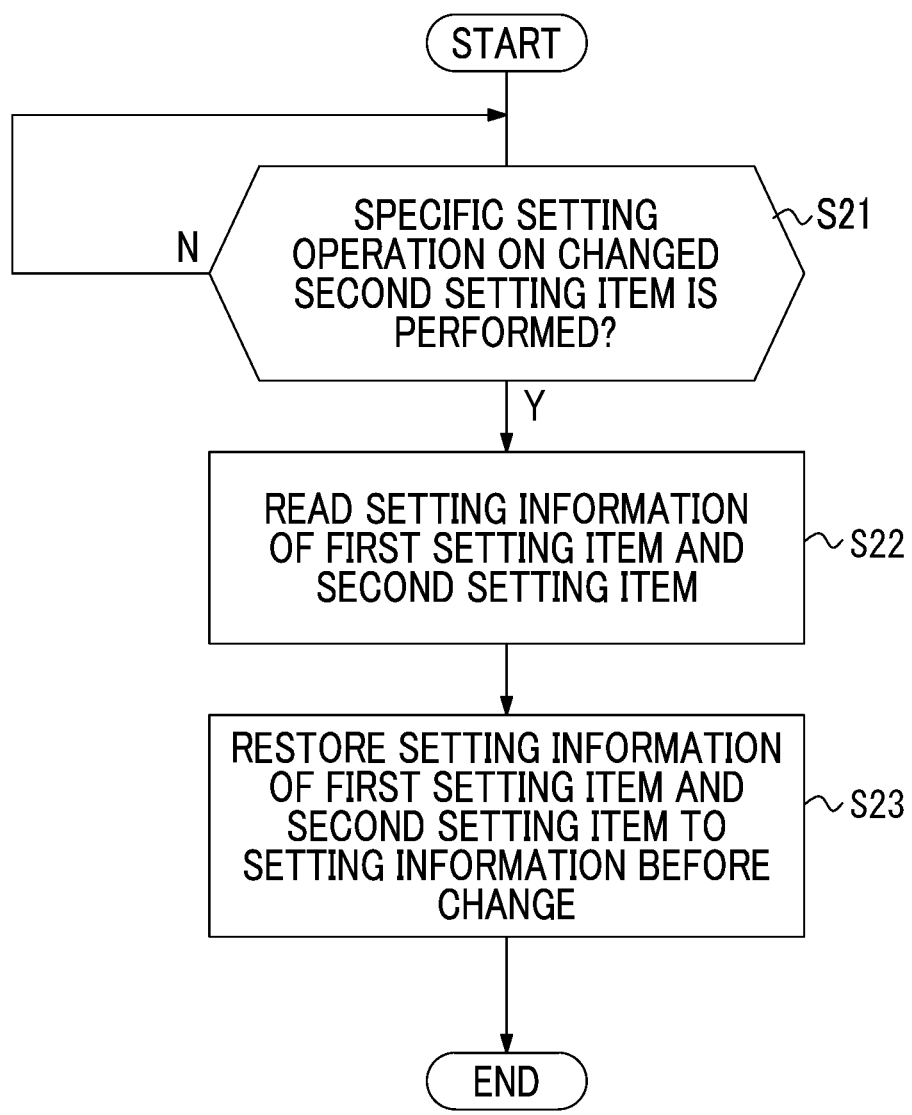
FIG. 15 is a flowchart illustrating processing for detecting a confused state and restoring setting information before change.

Next, a processing procedure for restoring the setting information of the first setting item and the second setting item to the setting information before the change in the digital camera 11 in a case where the user is in the confused state will be described along a flowchart of FIG. 15.

In the setting mode of the digital camera 11, the main control unit 41 displays the setting screen of the setting menu M on the rear display unit 14, and determines whether or not a specific setting operation is performed on the dynamic range setting changed by the main control unit 41 (the state shown in FIG. 13) (S21).

In a case where the specific setting operation, such as a long depression operation, is performed on the dynamic range setting changed by the main control unit 41 (in S21, Y), the main control unit 41 determines that the user is in a state of being confused about an operation, and reads the setting information of the ISO sensitivity and the dynamic range setting before the change stored in the setting information storage unit 48 (S22). In addition, the main control unit 41 restores the setting information relating to the imaging conditions of the imaging unit to the setting information before the change based on the read setting information of the ISO sensitivity and the dynamic range setting before the change (S23). That is, the setting information that causes the confused state of the user is restored to the setting information before the change.

As described above, in the embodiment, the setting information of the first setting item and the setting information of the second setting item selectable exclusively with respect to the setting information of the first setting item are stored, and in a case where the determination is made that specific setting operation that is highly likely to be performed when the user is in the confused state is performed, the setting information of the first setting item and the second setting item is restored to the setting information before the change. For this reason, it is possible to determine the confused state of the user and to restore the setting information causing the confused state to the setting information before the change. With this, it is possible to easily resolve the confused state.

Second Embodiment

In the above-described first embodiment, although the ISO sensitivity and the dynamic range setting have been exemplified as the first setting item and the second setting item in the appended claims, the invention is not limited thereto, and in a second embodiment described below, the imaging mode and the flash mode are exemplified as the first setting item and the second setting item. That is, there is the setting information of the flash mode selectable exclusively with respect to the setting information of the imaging mode.

Specifically, in a case where continuous imaging is selected as the setting information of the imaging mode, only suppressed flash is selectable as the setting information in the flash mode, and all of "AUTO", "forced flash", "slow synchro", and "rear-curtain synchro" are unselectable. This is because the imaging mode is set to continuous imaging, and accordingly, an electric charge accumulation time for one frame by the imaging element 34 is short and the flash light emission unit 24 does not emit flash light in time, that is, flash imaging cannot be performed.

FIG. 16A shows after the setting information is set in the imaging mode and the flash mode, that is, a state in which setting is completed, the imaging mode is set to "single frame imaging", and the flash mode is set to "AUTO" (display surrounded by a double frame line).

In a case where the main control unit 41 changes the setting information of the imaging mode to "continuous imaging" according to an operation of the operation button 26 or the touch panel 27 from the state shown in FIG. 16A in which the setting information of the imaging mode and the setting information of the flash mode are set, as described above, there is the setting information of the flash mode selectable exclusively with respect to continuous imaging, and all of "AUTO", "forced flash", "slow synchro", and "rear-curtain synchro" are unselectable. Thus, in this case, as in an example shown in FIG. 16B, the main control unit 41 functions as a setting change unit that changes the setting information of the flash mode to the setting information according to continuous imaging, that is, changes the setting information of the flash mode to "suppressed flash".

In a case where the main control unit 41 functioning as the setting change unit changes the setting information of the flash mode to the setting information according to the setting information of the imaging mode, as in the above-described first embodiment, the main control unit 41 makes the setting information storage unit 48 store the setting information of the imaging mode and the setting information of the flash mode before the change and after the change.

In a case where the setting information of the flash mode is changed to the setting information according to the setting information of the imaging mode, and the setting screen of the setting menu M is displayed on the rear display unit 14, as in the above-described first embodiment, the main control unit 41 determines whether or not the specific setting operation is performed. In a case where the specific setting operation is performed, the main control unit 41 restores the setting information of the imaging mode and the setting information of the flash mode to the setting information before the change (the state shown in FIG. 16A).

Third Embodiment

In a third embodiment described below, the bracket imaging mode and the image quality mode are exemplified as the first setting item and the second setting item in the appended claims. That is, there is the setting information of the image quality mode selectable exclusively with respect to the setting information of the bracket imaging mode. In a case of setting the bracket imaging mode, for example, bracket imaging is selected from the setting information (see FIG. 8) of the imaging mode described above.

In a case where bracket imaging is selected, as shown in FIG. 17, a selection candidate list of the bracket imaging mode including selection candidates, such as "exposure value", "ISO sensitivity", "filter", "white balance", and "dynamic range", is displayed. When the operation button 26 or the touch panel 27 is operated, the setting information of the bracket imaging mode is selected from the selection candidate list. With this, bracket imaging is performed while changing a set value of any one of exposure value, ISO sensitivity, filter, white balance, and dynamic range.

In a case where "white balance" is selected as the setting information of the bracket imaging mode, only "FINE" is selectable as the setting information in the image quality mode, and all of "NORMAL", "FINE+RAW", "NORMAL+ RAW", and "RAW" are unselectable. FIG. 18A shows after the setting information is set in the bracket imaging mode and the image quality mode, that is, a state in which setting is completed, the bracket imaging mode is set to "exposure value", and the image quality mode is set to "RAW" (display surrounded by a double frame line).

In a case where the main control unit 41 changes the setting information of the bracket imaging mode to "white balance" according to an operation of the operation button 26 or the touch panel 27 from the state shown in FIG. 18A in which the setting information of the bracket imaging mode and the setting information of the image quality mode are set, as described above, there is the setting information of the image quality mode selectable exclusively with respect to "white balance", and all of "NORMAL", "FINE+ RAW", "NORMAL+RAW", and "RAW" are unselectable. Thus, in this case, as in an example shown in FIG. 18B, the main control unit 41 functions as a setting change unit that changes the setting information of the image quality mode to the setting information according to "white balance", that is, changes the setting information of the image quality mode to "FINE".

In a case where the main control unit 41 functioning as the setting change unit changes the setting information of the image quality mode to the setting information according to the setting information of the bracket imaging mode, as in the above-described first embodiment, the main control unit 41 makes the setting information storage unit 48 store the setting information of the bracket imaging mode and the setting information of the image quality mode before the change and after the change.

In a case where the setting information of the image quality mode is changed to the setting information according to the setting information of the bracket imaging mode, and the setting screen of the setting menu M is displayed on the rear display unit 14, as in the above-described first embodiment, the main control unit 41 determines whether or not the specific setting operation is performed. In a case where the specific setting operation is performed, the main control unit 41 restores the setting information of the bracket imaging mode and the setting information of the image quality mode to the setting information before the change (the state shown in FIG. 18A).

Fourth Embodiment

In a fourth embodiment described below, the shutter system and the continuous shooting speed are exemplified as the first setting item and the second setting item in the appended claims. That is, there is the setting information of the continuous shooting speed selectable exclusively with respect to the setting information of the shutter system. In a case of setting the continuous shooting speed, for example, continuous imaging is selected from the setting information (see FIG. 8) of the imaging mode described above.

In a case where continuous imaging is selected, as shown in FIG. 19, a selection candidate list of the continuous shooting speed including selection candidates, such as "8 fps (frames per second)", "11 fps", and "15 fps", is displayed. When the operation button 26 or the touch panel 27 is operated, the setting information of the continuous shooting speed is selected from the selection candidate list. With this, continuous imaging is performed at the selected continuous shooting speed.

Figure 20A:
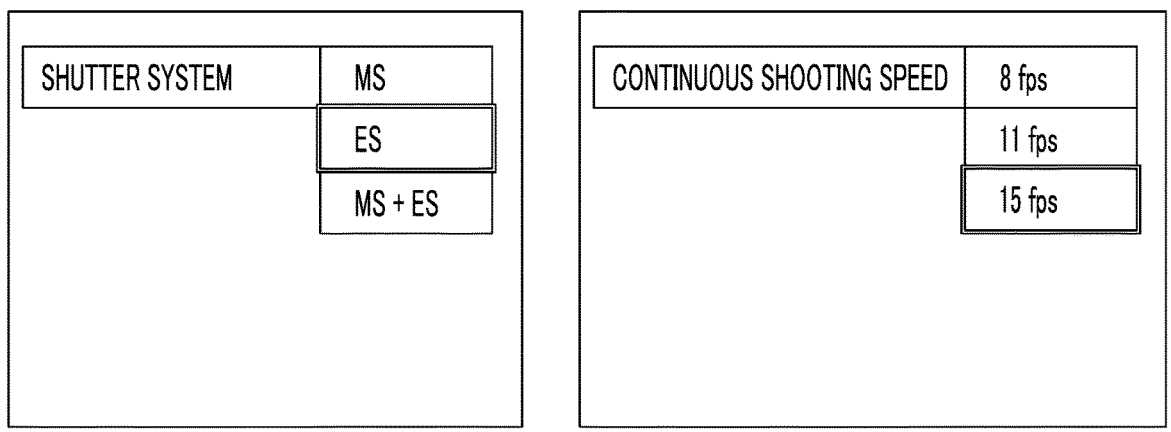
FIG. 20A is an explanatory view showing an example of a setting screen before setting information of the shutter system is changed in the fourth embodiment.

In a case where "MS" is selected as the setting information of the shutter system, only the lowest speed "8 fps" is selectable as the setting information in the continuous shooting speed, and both of "11 fps" and "15 fps" are unselectable. FIG. 20A shows after the setting information is set in the shutter system and the continuous shooting speed, that is, a state in which setting is completed, the shutter system is set to "ES", and the continuous shooting speed is set to "8 fps" (display surrounded by a double frame line).

Figure 20B:
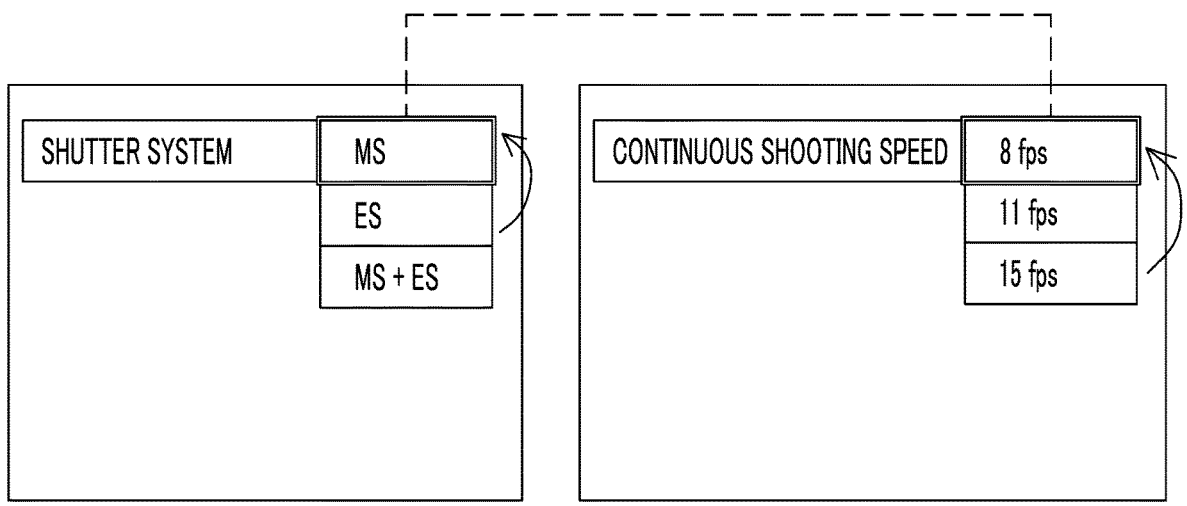
FIG. 20B is an explanatory view showing an example of a setting screen in a case where the setting information of the shutter system is changed and setting information of the continuous shooting speed is changed to setting information according to the setting information of the shutter system.

In a case where the main control unit 41 changes the setting information of the shutter system to "MS" according to an operation of the operation button 26 or the touch panel 27 from the state shown in FIG. 20A in which the shutter system and the continuous shooting speed are set, as described above, there is the setting information of the continuous shooting speed selectable exclusively with respect to the shutter system "MS", and both of "11 fps" and "15 fps" are unselectable. Thus, in this case, as in an example shown in FIG. 20B, the main control unit 41 functions as a setting change unit that changes the setting information of the continuous shooting speed to the setting information according to "MS", that is, changes the setting information of the continuous shooting speed to "8 fps".

In a case where the main control unit 41 functioning as the setting change unit changes the setting information of the continuous shooting speed to the setting information according to the setting information of the shutter system, as in the above-described first embodiment, the main control unit 41 makes the setting information storage unit 48 store the setting information of the shutter system and the setting information of the continuous shooting speed before the change and after the change.

In a case where the setting information of the continuous shooting speed is changed to the setting information according to the setting information of the shutter system, and the setting screen of the setting menu M is displayed on the rear display unit 14, as in the above-described first embodiment, the main control unit 41 determines whether or not the specific setting operation is performed. In a case where the specific setting operation is performed, the main control unit 41 restores the setting information of the shutter system and the setting information of the continuous shooting speed to the setting information before the change (the state shown in FIG. 20A).

In the respective embodiments described above, although an example where the main control unit 41 as the determination unit determines that the specific setting operation is performed in a case where the long depression operation is performed has been described, the specific setting operation is not limited thereto, and in a case where the second setting item after the change and the setting information thereof are displayed in a special display form on the rear display unit 14 (see FIG. 13), and a setting operation is performed on the second setting item and the setting information thereof displayed in the special display form, determination may be made the specific setting operation is performed.

In the respective embodiments described above, although an example where determination is made whether or not the specific setting operation is performed in a case where the setting screen of the setting menu M is displayed on the rear display unit 14 has been described, the invention is not limited thereto, and the main control unit as the determination unit may determine whether or not the specific setting operation is performed in a case where the setting screen of the selection candidate list is displayed. As shown in FIG. 21, in a case where the display of the setting screen of the setting menu M and the display of the setting screen of the selection candidate list are alternately repeated, the number of repetitions may be counted, and in a case where the number of repetitions is equal to or greater than a predetermined number of repetitions, determination may be made that the specific setting operation is performed. In an example shown in FIG. 21, the setting information of the dynamic range setting is the setting information of the second setting item after the change by the main control unit 41, and in both of the setting screen of the setting menu M and the setting screen of the selection candidate list, the selection of the setting information of the dynamic range setting is disabled.

Alternatively, a special operation unit that is used in an operation different from a normal setting operation of the operation button 26 or the touch panel 27, for example, the exposure correction dial 21, the shutter speed dial 22, or the like may be provided as an operation unit of the digital camera 11, and the main control unit 41 may determine that the specific setting operation is performed in a case where the setting screen of the setting menu M is displayed on the rear display unit 14 and an operation of the special operation unit is performed.

In the respective embodiments described above, the imaging element 34 is a CMOS type image sensor, but may be a CCD type image sensor. In the respective embodiments described above, the finder unit is a hybrid view finder, but may be an electronic view finder. In the respective embodiments described above, although the embedded flash light emission unit is used, an external flash device may be used.

The invention can be applied to an imaging apparatus, such as a video camera, in addition to the digital camera.

EXPLANATION OF REFERENCES

11: digital camera
12: camera body
13: lens barrel
14: rear display unit
15: finder unit
15a: finder objective window
15b: finder eyepiece unit
16: imaging optical system
17: focus ring
18: stop ring
19: power lever
20: release switch
21: exposure correction dial
22: shutter speed dial
23: finder switch lever
24: flash light emission unit
26: operation button
27: touch panel
28: in-finder display unit
31: focus lens
32: stop unit
32a: stop leaf blade
33: shutter unit
34: imaging element
36, 37, 38: motor
39: motor driver
41: main control unit
42: bus
44: memory control unit
45: digital signal processing unit
46: medium control unit
47: display control unit
48: setting information storage unit
49: memory
51: recording medium

What is claimed is:

1. An imaging apparatus comprising:
an imaging unit, including a sensor, that captures a subject image;
controller circuitry configured to:
set first setting information of a first setting item and second setting information of a second setting item, the second setting information being selectable exclusively with respect to the first setting information of the first setting item, the first and second setting items respectively corresponding to one of imaging conditions of the imaging unit;
store, in a setting information storage, the first setting information of the first setting item and the second setting information of the second setting item;
in a case where the first setting information of the first setting item is changed to third setting information through an operation of the controller circuitry after the first setting information is set in the first setting item and the second setting information is set in the second setting item, change the second setting information of the second setting item to fourth setting information according to the third setting information of the first setting item;
display the fourth setting information of the second setting item;
receive a setting operation on the second setting item that is changed to the fourth setting information;
determine that the received setting operation is a specific setting operation on the second setting item that is changed to the fourth setting information when the received setting operation has been continued for at least a predetermined time period; and
restore the third setting information of the first setting item and the fourth information of the second setting item respectively to the first setting information and the second setting information stored in the setting information storage in a case when it is determined that the specific setting operation is performed.

2. The imaging apparatus according to claim 1, further comprising:
a display on which a setting screen including the second setting item is displayed,
wherein the controller circuitry determines whether or not the specific setting operation is performed in a case where the setting screen is displayed on the display.

3. The imaging apparatus according to claim 2,
wherein the display displays the setting information of the second setting item after the change in a special display form, and
the controller circuitry determines that the specific setting operation is performed in a case where a setting operation is performed on the setting information of the second setting item displayed in the special display form.

4. The imaging apparatus according to claim 2, wherein the controller circuitry is further configured to:
be used in an operation different from a normal setting operation, and determine that the specific setting operation is performed in a case where the setting screen is displayed on the display and an operation is performed.

5. The imaging apparatus according to claim 2, wherein the setting screen is a setting list screen on which a plurality of setting items are displayed.

6. The imaging apparatus according to claim 2, wherein the setting screen is a setting confirmation screen including the setting information of the second setting item.

7. The imaging apparatus according to claim 2, wherein the setting screen is a setting list screen on which a plurality of setting items are displayed and a setting confirmation screen including the setting information of the second setting item, and the controller circuitry counts the number of repetitions in which display of the setting list screen and display of the setting confirmation screen are alternately repeated, and determines that the specific setting operation is performed in a case where the number of repetitions is equal to or greater than a predetermined number of repetitions.

8. A control method for an imaging apparatus comprising:

a step of setting first setting information of a first setting item and second setting information of a second setting item, the second setting information being selectable exclusively with respect to the first setting information of the first setting item, the first and second setting items respectively corresponding to one of imaging conditions of an imaging unit including a sensor;

a step of storing the first setting information of the first setting item and the second setting information of the second setting item;

a step of, in a case where the first setting information of the first setting item is changed to third setting information after the first setting information is set in the first setting item and the second setting information is set in second setting item, changing the second setting information of the second setting item to fourth setting information according to the first third setting information of the first setting item;

a step of displaying the second setting information of the second setting item after the change;

a step of receiving a setting operation on the second setting item that is changed to the fourth setting information;

a step of determining that the received setting operation is a specific setting operation on the second setting item that is changed to the fourth setting information when the received setting operation has been continued for at least a predetermined time period;

a step of restoring the third setting information of the first setting item and the fourth setting information of the second setting item respectively to the first setting information and the second setting information in a case when it is determined that the specific setting operation is performed.

\* \* \* \* \*